United States Patent
Tanaka et al.

[11] Patent Number: 5,718,437
[45] Date of Patent: Feb. 17, 1998

[54] COMBINED OIL RING WITH SPACER/ EXPANDER HAVING $CR_2N$ COATING THEREON

[75] Inventors: Shoji Tanaka; Nobuyuki Yamashita, both of Shiojiri; Hiroto Fukutome, Chino, all of Japan

[73] Assignee: Teikoku Piston Ring Co., Ltd., Tokyo, Japan

[21] Appl. No.: 767,800

[22] Filed: Dec. 17, 1996

[30] Foreign Application Priority Data

Dec. 19, 1995 [JP] Japan ................. 7-348870

[51] Int. Cl.[6] ........................................ F16J 9/26
[52] U.S. Cl. ........................... 277/139; 277/235 A
[58] Field of Search ..................... 277/235 A, 139, 277/140, 141

[56] References Cited

U.S. PATENT DOCUMENTS

| | | | |
|---|---|---|---|
| 2,713,527 | 7/1955 | Pier | 277/140 |
| 4,407,515 | 10/1983 | Naito | 277/139 |
| 4,985,092 | 1/1991 | Kaede et al. | 148/326 |
| 5,449,547 | 9/1995 | Miyazaki et al. | 428/217 |
| 5,587,227 | 12/1996 | Ooya | 428/217 |

FOREIGN PATENT DOCUMENTS

| | | | |
|---|---|---|---|
| 486320 | 5/1992 | European Pat. Off. | 277/235 A |
| 5456 | 1/1983 | Japan | 277/139 |
| 1-156461 | 6/1989 | Japan . | |
| 1-159449 | 6/1989 | Japan . | |
| 1-22921 | 7/1989 | Japan . | |
| 1-22922 | 7/1989 | Japan . | |
| 1-22924 | 7/1989 | Japan . | |
| 6-3170 | 1/1994 | Japan . | |
| 6-25597 | 4/1994 | Japan . | |
| 6-235462 | 8/1994 | Japan . | |
| 662213 | 12/1951 | United Kingdom | 277/235 A |
| 2 276 176 | 9/1994 | United Kingdom . | |

*Primary Examiner*—Scott Cummings
*Attorney, Agent, or Firm*—Armstrong, Westerman, Hattori, McLeland & Naughton

[57] ABSTRACT

A combined oil ring is comprised of paired upper and lower side rails, and a spacer expander. The side rails are made of martensitic stainless steel and are subjected to gas nitriding. The spacer expander is made of austenitic stainless steel, with a substantially U-shaped cross section, and has an under layer formed by soft nitriding, and has a $Cr_2N$ film. The $Cr_2N$ film has a hardness of HV1300 to HV2000 and a thickness of 3 μm to 30 μm. The $Cr_2N$ film is formed by ion plating on the soft-nitrided layer of the outer circumferential surface.

4 Claims, 2 Drawing Sheets

COMBINED OIL RING WITH SPACER/ EXPANDER HAVING CR₂N COATING THEREON

BACKGROUND OF THE INVENTION

1. Technical Field of the Invention

This invention relates to a combined oil ring fitted on a piston in an internal combustion engine.

2. Description of the Related Art

One type of oil rings used in reciprocating internal combustion engines is comprised of three pieces; paired upper and lower side rails, and a spacer expander for pressing these side rails against the cylinder inner circumferential surface and against the ring groove side surfaces. In this type of combined oil ring, when any one of the side rail outer circumferential surface, side rail inner circumferential surface and side rail pressing portions of the spacer expander for pressing the side rail inner circumferential surface becomes worn, the oil ring performance deteriorates because the pressing force exerted on the side rail by the spacer expander deteriorates. In order to improve these portions of the combined oil ring to be more resistant to wear, generally the side rail is made of martensitic stainless steel and is subjected to gas nitriding, while the spacer expander is made of austenitic stainless steel and is subjected to soft nitriding. In a combined oil ring of the above type, there is more wear on the side rail pressing portions of the spacer expander than on the side rail inner circumferential surface. Therefore, improving the durability of the side rail pressing portions becomes essential.

The following technology has been proposed as explained below.

Regarding a compression ring having a hard film coated by physical vapor deposition process:

A piston ring formed with a composite film made from Cr and Cr₂N on the outer circumferential surface (Japanese Patent Publication No. 6-25597).

A piston ring formed with a Cr₂N film of 10–50 μm thickness on the outer circumferential surface by reactive ion plating process (Japanese Patent Laid-open No. 1-156461).

A piston ring formed with a composite film made from Cr₂N and CrN on the outer circumferential surface (Japanese Patent Laid-open No. 1-159449).

A compression ring formed with a soft-nitrided layer or a chromium plating and a CrN film formed over the soft-nitrided layer or the chromium plating (Japanese Utility Model Publication No. 1-22921 and Japanese Utility Model Publication No. 1-22922).

Regarding a spacer expander

A spacer expander formed with a Ni-based composite plating on the outer circumferential surface (Japanese Utility Model Publication No. 6-3170).

A combined oil ring having a spacer expander formed with a soft-nitrided layer or a chromium plating and a CrN film formed over the soft-nitrided layer or the chromium plating (Japanese Utility Model Publication No. 1-22924).

A combined oil ring having side rails formed with a hard film such as TiN on the inner circumferential surface by chemical vapor deposition process, and a spacer expander formed with a film of chromium nitride on the outer circumferential surface (Japanese Patent Laid-open No. 6-235462).

However, in the spacer expander of Japanese Utility Model Publication No. 6-3170, the wear resistance and reliability are inadequate. In the spacer expanders of Japanese Utility Model Publication No. 1-22924, and Japanese Patent Laid-open No. 6-235462, peeling was found to occur during operation because of poor toughness when the CrN film is applied to the side rail pressing portions of the spacer expander.

Various types of ion plating films are known, just as above for forming a suitable film on the outer circumferential surface of the compression ring.

However, the sliding conditions for the compression ring are as follows.

Sliding mating material: Generally cast iron
Sliding speed: On the order of 10m/s
Contact pressure: Approximately 2kgf/cm²
Lubricating conditions: Mainly hydrodynamic lubrication In contrast to the above however, the sliding conditions for the side rail pressing portions of the spacer expander are as follows.

Sliding mating material: Martensitic stainless steel subjected to gas nitriding.
Sliding speed: Virtually zero
Contact pressure: At least 20kgf/cm²
Lubricating conditions: Mainly boundary lubrication These conditions differ from the above compression ring sliding conditions.

These differing conditions indicate therefore that the physical vapor deposition film for the above described compression ring can not be easily applied to the side rail pressing portions of the spacer expander.

SUMMARY OF THE INVENTION

It is an object of this invention to provide a combined oil ring of superior durability and reliability by means of improving the durability of the side rail pressing portions of the spacer expander.

This invention fulfills the above object by forming a hard film with superior resistance to wear and resistance to peeling at the side rail pressing portions of the spacer expander that contacts the inner circumferential surface of the side rails. That is, the combined oil ring of this invention has one spacer expander and two side rails, with the spacer expander having side rail pressing portions for pressing the side rails, the side rail pressing portions having a Cr₂N film at the portion contacting the side rail, and the Cr₂N film having a Vickers hardness of HV1300 to HV2000.

A Cr₂N film thickness is preferably in a range of 3–30 μm. Durability is insufficient when the film thickness drops below 3 μm. When the film thickness exceeds 30 μm, the wear resistance is sufficient but forming a film with good adhesion is difficult.

The Cr₂N film of this invention is obtained in the ion plating process by regulating the vaporization rate of the chromium which is the evaporating source and the pressure of nitrogen gas in the processing chamber. The hardness of the Cr₂N film can be controlled by adjusting a bias voltage.

In the combined oil ring having the aforementioned spacer expander, the side rail is preferably formed with a nitrided layer at the portion making contact with the side rail pressing portion of the spacer expander.

In this invention, the side rail pressing portion of the spacer expander making contact with the inner circumferential surface of the side rail has improved wear resistance by means of the aforementioned method. Thus, the oil ring performance does not deteriorate for long period. Further, reliability can be guaranteed since no cracks or peeling occurs in the hard film of the side rail pressing portion of the spacer expander even after long, extended periods of operation

BRIEF DESCRIPTION OF THE DRAWINGS

The aforesaid and other objects and features of the present invention will become more apparent from the following detailed description and the accompanying drawings.

DESCRIPTION OF THE PREFERRED EMBODIMENT

Figure 1:
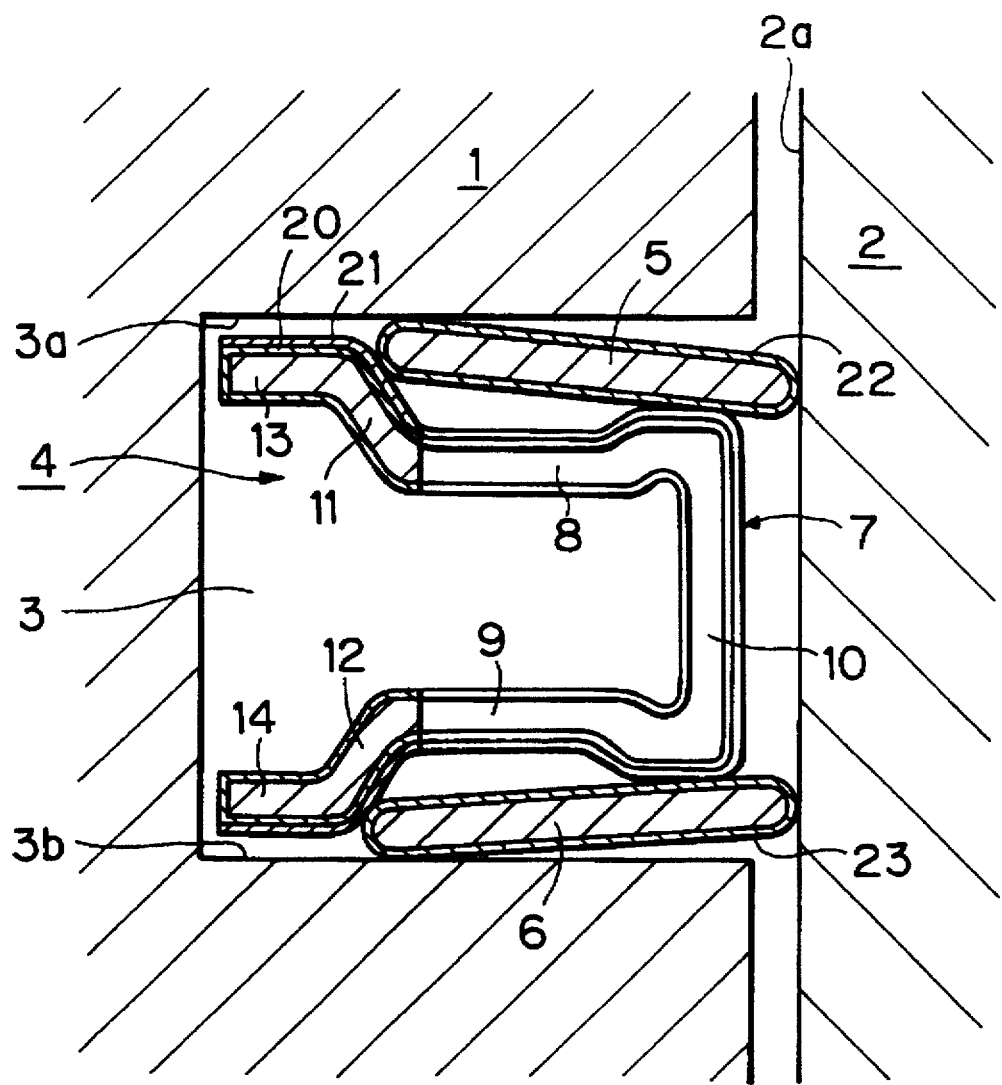
FIG. 1 is a longitudinal cross sectional view showing a combined oil ring which is fitted in an oil ring groove of the piston inserted into the cylinder in an embodiment of this invention.

FIG. 1 is a longitudinal cross sectional view showing a combined oil ring which is fitted in an oil ring groove of the piston inserted into the cylinder in one preferred embodiment of this invention. Referring now to FIG. 1, a combined oil ring 4 is fitted in an oil ring groove 3 formed on the outer circumferential surface of a piston 1 inside a cylinder 2. The combined oil ring 4 is comprised of a pair of upper and lower side rails 5 and 6 which are annular with a gap; and a spacer expander 7 which is annular with a gap.

Figure 2:
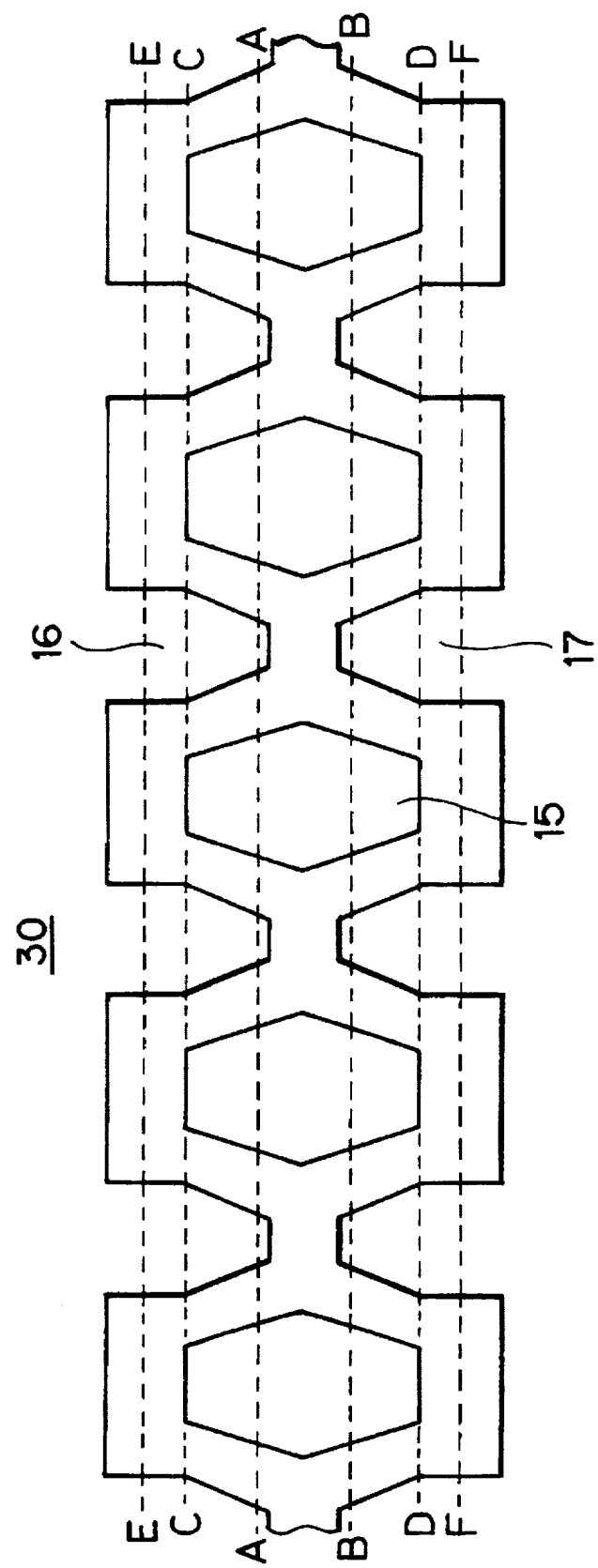
FIG. 2 is a plan view showing a portion of the material of a spacer expander.

The spacer expander 7 is formed as follows. A material 30 shown in FIG. 2 is formed from a thin strip of austenitic stainless steel and has a symmetrical shape with respect to the center axis running longitudinally. That is, the thin steel strip of austenitic stainless steel is provided with a plurality of tortoise shell-like holes 15, which serve as oil holes and are equally spaced in a longitudinal direction of the thin steel strip. Substantially V-shaped slits 16 and 17 are provided on both sides of the thin steel strip between the holes 15. This material 30 is bent symmetrically. In other words, the material 30 is bent along the bending lines A—A and B—B into a substantially U-shaped cross section. Next, the upper and lower end portions are bent along the bending lines C—C and D—D to stand obliquely, and then the edges of the upper and lower standing portions are bent horizontally along the bending lines E—E and F—F. Once the above bending step of the material 30 is complete, tufftriding treatment is performed. The material 30 after bending step and tufftriding treatment is then cut into a predetermined length, and formed to be annular so that the side rail pressing portions are arranged at the position of the inner peripheral side, and then formed with a $Cr_2N$ film on the outer circumferential surface by ion plating.

This spacer expander 7 is composed of a plurality of periodic elements linked together peripherally and having a substantially U-shaped cross section. Each of these periodic elements has a horizontal upper portion 8 and lower portion 9 positioned at intervals in the axial direction. The outer circumferences of these upper and lower portions 8 and 9 are connected by an upright portion 10. Side rail pressing portions 11 and 12 are formed respectively obliquely facing inwards radially at the inner circumference of the upper portion 8 and lower portion 9. At the inner circumference of each of the side rail pressing portions 11 and 12, are inner portions 13 and 14 extending horizontally to the inner radial direction. Oil holes are formed in the upper portion 8, the upright portion 10 and the lower portion 9.

The spacer expander 7 comprised of austenitic stainless steel is subjected to tufftriding treatment and formed on all surfaces with a soft-nitrided layer 20 as the under coating at a hardness of HV900 to HV1200. A $Cr_2N$ film 21 having a thickness of 3 μm to 30 μm and having a hardness of HV1300 to HV2000 is formed by means of ion plating on the soft-nitrided layer 20 at the outer circumferential surface including the side rail pressing portions 11 and 12. Chromium plating may be employed instead of the soft-nitrided layer, as the under coating.

The pair of side rails 5 and 6 are made of martensitic stainless steel, subjected to gas nitriding and formed with nitrided layers 22 and 23 on all surfaces. These side rails may be formed with nitrided layers on only the inner and outer circumferential surfaces by ion nitriding.

The spacer expander 7 is provided in the oil ring groove 3 of the piston 1 in a compressed state with the paired ends abutting each other to exert an expanding force in outward radially. The pair of side rails 5 and 6 are supported separately above and below (axially) by the upper and lower portions 8 and 9. The upper and lower side rail pressing portions 11 and 12 apply pressure on the respective inner circumferential surfaces of the pair of side rails 5 and 6, so that the respective outer circumferential surfaces of the side rails 5 and 6 are made contact with the inner circumferential surface 2a of the cylinder 2, and the inner circumferential ends of the side rails 5 and 6 are made contact with the side surfaces 3a and 3b of the oil ring groove 3.

Hereafter, tests for verifying the effect of this invention will be described. The engine tests were performed utilizing a combined oil ring consisting of a spacer expander of austenitic stainless steel with the structure of the above embodiment, and side rails of martensitic stainless steel having gas nitriding performed on all surfaces. In the evaluation of the hard film of the spacer expander, the amount of lubricating oil consumption indicating the wear resistance was measured, and after operating the engine for 300 hours, observations were made to detect cracks or peeling in the hard film of the side rail pressing portions.

Test condition and results are explained below.

1. Conditions for Forming a Hard Film of the Spacer Expander

Tufftriding treatment was performed on the spacer expander to form a soft-nitrided layer with a hardness of HV800 on all surfaces of the spacer expander. Ion plating was then performed on the outer circumferential surface including the side rail pressing portions under the various conditions shown in Table 1. The ion plating film had a thickness of 20 μm. The ion plating film obtained was subjected to X-ray diffraction analysis to identify the deposition phase and the Vicker's hardness was measured. Table 1 shows ion plating conditions, film hardness, and deposition phase structure.

TABLE 1

| | Number | Evaporating source | Bias voltage V | Pressure in chamber mTorr | Film hardness HV | Crystal structure (Note 1) |
|---|---|---|---|---|---|---|
| Comparative Example | 1 | — | — | — | 800 | soft nitriding |
| | 2 | Cr | 50 | 10 | 1650 | CrN |
| | 3 | Cr | 5 | 1 | 1250 | $Cr_2N$ |
| | 4 | Cr | 45 | 1.2 | 2030 | $Cr_2N$ |
| | 5 | Cr | 10 | 3 | 1400 | $Cr_2N$ + CrN |
| | 6 | Cr | 20 | 0.5 | 1200 | $Cr_2N$ + Cr |
| Embodiment | 1 | Cr | 10 | 1 | 1300 | $Cr_2N$ |
| | 2 | Cr | 25 | 1 | 1700 | $Cr_2N$ |

TABLE 1-continued

| Number | Evaporating source | Bias voltage V | Pressure in chamber mTorr | Film hardness HV | Crystal structure (Note 1) |
|---|---|---|---|---|---|
| 3 | Cr | 40 | 1 | 2000 | $Cr_2N$ |

(Note 1) Determined by X-ray diffraction analysis data

2. Engine Tests

The above-mentioned combined oil ring was utilized in a four cylinder diesel engine (bore I.D. 93 mm) in endurance tests under high speed, full load conditions. The lubricating oil consumption was measured after engine operation at 50 hours and 300 hours. After completion of the endurance testing, the side rail pressing portion of the spacer expander was examined under a stereo microscope at 50× power, and the hard film was examined for the presence of cracks or peeling.

3. Engine Test Results

The most general configuration of the cracks observed was a network with a mesh size of 20–50 μm and with crack width of approximately 10 μm. Peeling of mesh segments was observed in extreme cases. These peeled fragments may damage the piston ring groove and cylinder wall, and the edge of the side rail pressing portion at which peeling occurred may damage the inner circumferential surface of the side rail.

Table 2 shows results of the engine tests. The allowable upper limit of lubricating oil consumption is 50 grams per hour.

TABLE 2

| | Number | Lubricating oil consumption at 50 hours of engine operation g/Hr | Lubricating oil consumption at 300 hours of engine operation g/Hr | Presence of cracks or peeling |
|---|---|---|---|---|
| Comparative | 1 | 47 | 102 | none |
| Example | 2 | 30 | 41 | presence |
| | 3 | 31 | 68 | none |
| | 4 | 32 | 36 | presence |
| | 5 | 28 | 38 | presence |
| | 6 | 35 | 85 | none |
| Embodiment | 1 | 28 | 33 | none |
| | 2 | 27 | 30 | none |
| | 3 | 30 | 34 | none |

The above results are summarized as follows.

(1) The most generally used spacer expander subjected to soft nitriding has the largest lubricating oil consumption.

(2) After 300 hours of engine operation, cracks or peeling occurred in the CrN film or the composite film of CrN and $Cr_2N$ in the side rail pressing portion, so that durability cannot be guaranteed when this time is exceeded.

(3) When the Vickers hardness of the $Cr_2N$ film is less than HV1300, the wear resistance decreases, causing large consumption of lubricating oil. When the Vickers hardness of the $Cr_2N$ film is greater than HV2000, cracks or peeling occurs in the side rail pressing portion after 300 hours of engine operation, so that durability cannot be guaranteed when this time is exceeded.

(4) The wear resistance of the composite film of Cr and $Cr_2N$ is poor, so that the consumption of lubricating oil increases after long hours of operation.

(5) A $Cr_2N$ film with a Vickers hardness of HV1300–2000 has low lubricating oil consumption, and no peeling or cracks occur in the side rail pressing portion even after long hours of engine operation. Therefore, the wear resistance and reliability of the combined oil ring can be guaranteed.

The spacer expander of the combined oil ring of this invention is not limited by the form shown in the above embodiment. For instance, the inner portions 13 and 14 need not be provided in some configurations. Further, this invention is also applicable to combined oil rings provided with a space expander made of a plurality of radially corrugated periodic elements linked together in the circumferential direction.

Although the present invention has been described with reference to the preferred embodiments, it is apparent that the present invention is not limited to the aforesaid preferred embodiments, but various modification can be attained without departing from its scope.

What is claimed is:

1. A combined oil ring comprising one spacer expander and two side rails, said spacer expander having side rail pressing portions for pressing said side rails, said side rail pressing portions having a $Cr_2N$ film at the portion contacting said side rail, and said $Cr_2N$ film having a Vickers hardness of HV1300 to HV2000.

2. A combined oil ring as claimed in claim 1, wherein said $Cr_2N$ film has a thickness of 3 μm to 30 μm.

3. A combined oil ring as claimed in claim 1, wherein said side rails have a nitrided layer at the portion contacting said side rail pressing portion.

4. A combined oil ring as claimed in claim 2, wherein said side rails have a nitrided layer at the portion contacting said side rail pressing portion.

* * * * *